(12) United States Patent
Nakajima et al.

(10) Patent No.: US 11,325,011 B2
(45) Date of Patent: *May 10, 2022

(54) GOLF BALL MANUFACTURING METHOD

(71) Applicants: Bridgestone Sports Co., Ltd., Tokyo (JP); BRIDGESTONE CORPORATION, Tokyo (JP)

(72) Inventors: Tsuyoshi Nakajima, Chichibushi (JP); Yuichiro Ozawa, Chichibushi (JP); Daisuke Nakajima, Kodaira (JP)

(73) Assignees: BRIDGESTONE CORPORATION, Tokyo (JP); Bridgestone Sports Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/822,724

(22) Filed: Mar. 18, 2020

(65) Prior Publication Data

US 2020/0230469 A1   Jul. 23, 2020

Related U.S. Application Data

(63) Continuation of application No. 15/627,955, filed on Jun. 20, 2017, now Pat. No. 10,632,347.

(30) Foreign Application Priority Data

Jun. 23, 2016   (JP) ................................ 2016-124465

(51) Int. Cl.
| | |
|---|---|
| *A63B 45/00* | (2006.01) |
| *B29C 35/02* | (2006.01) |
| *C08K 5/098* | (2006.01) |
| *A63B 37/00* | (2006.01) |
| *B29C 71/02* | (2006.01) |
| *C08K 5/14* | (2006.01) |
| *B29C 71/04* | (2006.01) |
| *B29L 31/54* | (2006.01) |
| *B29K 19/00* | (2006.01) |

(52) U.S. Cl.
CPC .......... *A63B 45/00* (2013.01); *A63B 37/0051* (2013.01); *B29C 35/02* (2013.01); *B29C 71/02* (2013.01); *C08K 5/098* (2013.01); *C08K 5/14* (2013.01); *A63B 37/0003* (2013.01); *A63B 37/0023* (2013.01); *A63B 37/0074* (2013.01); *B29C 71/04* (2013.01); *B29K 2019/00* (2013.01); *B29L 2031/54* (2013.01)

(58) Field of Classification Search
CPC . A63B 45/00; A63B 37/0051; A63B 37/0074; A63B 37/0003; A63B 37/0023; C08K 5/14; C08K 5/098; B29C 71/02; B29C 35/02; B29C 71/04; B29K 2019/00; B29L 2031/54

See application file for complete search history.

(56) References Cited

U.S. PATENT DOCUMENTS

| | | | |
|---|---|---|---|
| 2,004,973 A * | 6/1935 | Behrman | H01M 50/411 429/140 |
| 2,743,931 A | 5/1956 | Pooley et al. | |
| 3,683,155 A | 8/1972 | Loofbourow | |
| 6,180,040 B1 | 1/2001 | Ladd et al. | |
| 6,558,274 B1 * | 5/2003 | Shimosaka | A63B 37/0004 473/351 |
| 6,652,393 B1 * | 11/2003 | Watanabe | A63B 37/06 473/377 |
| 6,872,423 B2 | 3/2005 | Brown et al. | |
| 6,939,497 B2 | 9/2005 | Scolamiero | |
| 2003/0052438 A1 | 3/2003 | Brum et al. | |
| 2004/0058750 A1 * | 3/2004 | Iwami | A63B 37/0003 473/371 |
| 2005/0171221 A1 * | 8/2005 | Danner | A63B 37/0031 521/41 |
| 2006/0148590 A1 | 7/2006 | Sullivan et al. | |
| 2006/0249880 A1 * | 11/2006 | Nagasawa | B29C 45/14819 264/279.1 |
| 2008/0081710 A1 | 4/2008 | Chen et al. | |
| 2009/0111612 A1 * | 4/2009 | Nanba | A63B 37/0003 473/373 |
| 2010/0056299 A1 * | 3/2010 | Egashira | A63B 37/0095 473/351 |
| 2013/0256321 A1 | 10/2013 | Bender | |

FOREIGN PATENT DOCUMENTS

| | | | |
|---|---|---|---|
| JP | 56-026422 | * | 6/1981 |
| JP | 56-026422 B2 | | 6/1981 |

OTHER PUBLICATIONS

Communication dated Oct. 6, 2020 from the Japanese Patent Office in Application No. 2016-124465.

* cited by examiner

*Primary Examiner* — Jeffrey M Wollschlager
(74) *Attorney, Agent, or Firm* — Sughrue Mion, PLLC

(57) ABSTRACT

A method of manufacturing golf balls having a core and a cover of at least one layer encasing the core includes the steps of producing a core by molding and vulcanizing a rubber composition containing (A) a base rubber, (B) an α,β-unsaturated carboxylic acid and/or a metal salt thereof, and (C) an organic peroxide; and heat-treating the core for 1 to 24 hours at between 175 and 300° C. Golf balls which undergo little energy loss and have a high initial velocity can be obtained by this method.

8 Claims, No Drawings

GOLF BALL MANUFACTURING METHOD

CROSS-REFERENCE TO RELATED APPLICATION

This application is a continuation of U.S. application Ser. No. 15/627,955 filed Jun. 20, 2017 which is a non-provisional application claiming priority under 35 U.S.C. § 119(a) on Patent Application No. 2016-124465 filed in Japan on Jun. 23, 2016, the entire contents of which are hereby incorporated by reference.

TECHNICAL FIELD

The present invention relates to a method of manufacturing a golf ball which has a core and a cover of at least one layer encasing the core.

BACKGROUND ART

The initial velocity of a golf ball is what drives increases in the distance traveled by the ball, and so it is desirable to raise the initial velocity to the very limit of what is permitted under the Rules of Golf. Golf balls are made of polymeric substances, with the majority of golf balls today being solid golf balls containing a core that is obtained by molding under applied heat a rubber composition prepared by adding a crosslinking agent or organic peroxide, metal oxides and the like to a base rubber such as polybutadiene rubber. The polymeric substances making up the golf ball contain volatile substances such as the following low-molecular-weight compounds: water, various additives and their decomposition products, the decomposition products of catalysts, and residual solvents. JP-B S56-26422 teaches art which, by removing at least fixed amounts of these volatile substances, imparts a golf ball with a higher initial velocity than pre-existing golf balls and is thus able to increase the distance traveled by the ball.

That is, the foregoing art subjects all or part of a golf ball to a given heat treatment so as to remove volatile substances and, by setting the removal ratio thereof to at least 1.0%, increases the coefficient of restitution and the initial velocity. In such art, the percent removal of volatile substances is calculated from the total weight of the volatile substances that volatilize off when the prescribed treatment (heat treatment) has been carried out and the weight of the substances that is subjected to such heat treatment.

However, the foregoing art does not focus on the volatile components which remain within the golf ball. What is actually important is not how much volatile substances have volatilized, but rather, when energy is imparted to the golf ball from the head of a golf club, the degree to which that energy can be converted without loss into initial velocity. Hence, there has long existed a desire for art that reduces the loss of energy.

SUMMARY OF THE INVENTION

It is therefore an object of this invention to provide a golf ball manufacturing method for obtaining golf balls which minimize energy loss and can thereby achieve an increased initial velocity.

As a result of extensive investigations, we have discovered that by molding and vulcanizing a rubber composition to produce a core and subsequently heat-treating the core at a temperature and time in specific ranges, the content of volatile substances from compounding ingredients in the rubber composition is reduced, increasing the initial velocity of the ball.

That is, in a method of manufacturing a golf ball having a core and a cover of at least one layer encasing the core, by having the method include the steps of:

producing a core by molding and vulcanizing a rubber composition containing (A) a base rubber, (B) an $\alpha,\beta$-unsaturated carboxylic acid and/or a metal salt thereof, and (C) an organic peroxide; and heat-treating the core for 1 to 24 hours at between 175 and 300° C., volatile substances remaining within the core are suitably decreased, making it possible to provide golf balls having a low energy loss, an increased initial velocity and an excellent distance performance.

Accordingly, the invention provides a method of manufacturing a golf ball having a core and a cover of at least one layer encasing the core, which method includes the steps of producing a core by molding and vulcanizing a rubber composition containing (A) a base rubber, (B) an $\alpha,\beta$-unsaturated carboxylic acid and/or a metal salt thereof, and (C) an organic peroxide; and heat-treating the core for 1 to 24 hours at between 175 and 300° C.

In a preferred embodiment of the golf ball manufacturing method of the invention, letting the heating temperature and heating time in the heat treatment step be respectively K (° C.) and T (h), the cumulative temperature X computed as $X=K\times(2+\text{Log } T)$ is at least 350, with the proviso that the heating temperature K is at least 175° C. and the heating time T is between 1 and 24 hours. The heating temperature K in this preferred embodiment is typically 250° C. or less. The cumulative temperature X in this preferred embodiment is typically 850 or less.

In the inventive method of manufacturing golf balls, it is preferable for the pressure during heat treatment to be atmospheric pressure or below.

In the heat treatment step of the manufacturing method of the invention, heat treatment of the core is preferably carried out in an atmosphere selected from the group consisting of air, hydrogen, oxygen, nitrogen, noble gases, carbon dioxide, and mixed gases thereof.

Advantageous Effects of the Invention

With the inventive method of manufacturing golf balls, it is possible to obtain golf balls which undergo little loss of energy and have a high initial velocity.

DESCRIPTION OF THE PREFERRED EMBODIMENTS

The objects, features and advantages of the invention will become more apparent from the following detailed description.

The inventive method of manufacturing golf balls is a method of manufacturing golf balls having a core and a cover of at least one layer encasing the core, and includes the step of producing a core by molding and vulcanizing a rubber composition containing components (A) to (C) below:

(A) a base rubber,
(B) an $\alpha,\beta$-unsaturated carboxylic acid and/or a metal salt thereof, and
(C) an organic peroxide.

The base rubber (A) is preferably a polybutadiene. It is advantageous to use as this polybutadiene one having a cis-1,4 bond content on the polymer chain of preferably at least 80 wt %, more preferably at least 90 wt %, and even more preferably at least 95 wt %. When the content of cis-1,4 bonds among the bonds on the polybutadiene molecule is too low, the resilience may decrease. The content of 1,2-vinyl bonds included in the polybutadiene is preferably not more than 2 wt %, more preferably not more than 1.7 wt %, and even more preferably not more than 1.5 wt %, of the polymer chain. When the content of 1,2-vinyl bonds is too high, the resilience may decrease.

From the standpoint of obtaining a molded and vulcanized rubber composition that has a high resilience, this polybutadiene is preferably one synthesized with a rare-earth catalyst or a group VIII metal compound catalyst. A polybutadiene synthesized with a rare-earth catalyst is especially preferred.

Rubber components other than the above polybutadiene may be included in the rubber composition within a range that does not detract from the advantageous effects of the invention. Illustrative examples of rubber components other than the above polybutadiene include other polybutadienes and also other diene rubbers, such as styrene-butadiene rubber, natural rubber, isoprene rubber and ethylene-propylene-diene rubber.

Illustrative examples of (B) the α,β-unsaturated carboxylic acid and/or metal salt thereof include acrylic acid, methacrylic acid, maleic acid and fumaric acid. Acrylic acid and methacrylic acid are especially preferred. Metal salts of unsaturated carboxylic acids are not particularly limited, and are exemplified by those obtained by neutralizing the foregoing unsaturated carboxylic acids with desired metal ions. Illustrative examples include the zinc salts and magnesium salts of methacrylic acid and acrylic acid. The use of zinc acrylate is especially preferred.

These unsaturated carboxylic acids and/or metal salts thereof serving as component (B) are included in an amount, per 100 parts by weight of the base rubber, which is preferably at least 5 parts by weight, more preferably at least 10 parts by weight, and even more preferably at least 15 parts by weight. The upper limit in the amount included is preferably not more than 60 parts by weight, more preferably not more than 50 parts by weight, and even more preferably not more than 45 parts by weight. When too much is included, the feel of the ball may become too hard and unpleasant. When too little is included, the rebound may decrease.

Some examples of (C) the organic peroxide include dicumyl peroxide, 1,1-bis(t-butylperoxy)-3,3,5-trimethylcyclohexane, 1,1-di(t-butylperoxy)cyclohexane, 2,5-dimethyl-2,5-di-(t-butylperoxy)hexane and 1,3-bis(t-butylperoxyisopropyl)benzene. Illustrative examples of commercially available organic peroxides include Percumyl D, Perhexa 3M, Perhexa C, Niper BW and Peroyl L (all from NOF Corporation), and Luperco 231XL (Atochem Co.).

The amount of organic peroxide included per 100 parts by weight of the base rubber is preferably at least 0.1 part by weight, more preferably at least 0.3 part by weight, even more preferably at least 0.5 part by weight, and most preferably at least 0.7 part by weight. The upper limit is preferably not more than 5 parts by weight, more preferably not more than 4 parts by weight, even more preferably not more than 3 parts by weight, and most preferably not more than 2 parts by weight. When too much or too little is included, it may not be possible to obtain a ball having a good feel, durability and rebound.

An inert filler such as zinc oxide, barium sulfate or calcium carbonate may be used in the rubber composition. Such fillers may be used singly or two or more may be used in combination.

In addition, an antioxidant may be optionally included in this invention. Examples of commercial antioxidants include Nocrac NS-6, Nocrac NS-30 and Nocrac 200 (all from Ouchi Shinko Chemical Industry Co., Ltd.), and Yoshinox 425 (Mitsubishi Chemical Corporation). These may be used singly or two or more may be used in combination.

When forming the core from the above rubber composition, the various above ingredients may be intensively mixed by a known mixing method, such as one that involves the use of a Banbury mixer, roll mill or other mixing apparatus, and then molded using a core mold.

The core is preferably obtained by additionally subjecting the rubber composition to from 10 to 25 minutes of vulcanization treatment at between 145 and 180° C. This vulcanization temperature is generally at least 145° C., preferably at least 150° C., and more preferably at least 155° C.; the upper limit is generally not more than 180° C., preferably not more than 170° C., and more preferably not more than 160° C. When the vulcanization temperature is too high, the durability decreases; when the vulcanization temperature is too low, the rebound and hardness decrease. The core vulcanization time is generally at least 10 minutes, and preferably at least 13 minutes; the upper limit is generally not more than 25 minutes, and preferably not more than 20 minutes. When the vulcanization time is too long, the productivity decreases; when the vulcanization time is too short, the hardness becomes unstable.

In this invention, by subjecting the core immediately after vulcanization to heat treatment under given conditions, the level of volatile substances included in the core (molded and vulcanized product) is ultimately reduced. The core immediately after vulcanization is generally cooled, and the core surface is subsequently abraded. In this invention, after abrasion of the core, it is desirable to carry out the heat treatment described below.

The conditions when heating the core are a temperature of preferably between 175 and 300° C., and more preferably between 210 and 250° C. When this heating temperature is too low, a sufficient ball initial velocity-increasing effect may not be obtained. On the other hand, when the heating temperature is too high, the durability of the ball may worsen.

Heat treatment is carried out for a heating time of preferably from 1 to 24 hours, and more preferably from 4 to 12 hours. When the heating time is too short, a sufficient ball initial velocity-increasing effect may not be obtained. On the other hand, when the heating time is too long, the durability of the ball may worsen.

In this heat treatment step, letting the heating temperature be K (° C.) and the heating time be T (h), it is preferable for the cumulative temperature X computed as $X = K \times (2 + \log T)$ to be 350 or more. When this cumulative temperature X is 350 or more, a high ball initial velocity is obtained, and the advantageous effects desired of this invention can be achieved. The upper limit in the cumulative temperature X is preferably 850 or less.

The pressure during heat treatment is preferably atmospheric pressure or below, and more preferably not more than 10,000 Pa. Heat treatment is preferably carried out in an atmosphere selected from the group consisting of air, hydrogen, oxygen, nitrogen, a noble gas, carbon dioxide, and mixed gases thereof.

The decrease in volatile substances and the evaporation of moisture owing to the above heat treatment gives rise to a weight loss between the core immediately after vulcanization and the core following such heat treatment. With regard to moisture in particular, it has been confirmed that atmospheric moisture is reabsorbed near the core surface on account of cooling and storage following this heat treatment. However, compared with the core surface, moisture absorption does not readily occur near the core center, and so the vicinity of the core center remains in substantially the same state as that following the above heat treatment. It is therefore possible to detect whether heat treatment has been carried out and the degree of such treatment by looking at the difference between the core center and the core surface in percent weight loss in thermogravimetry.

Specifically, in thermogravimetric analysis of the core, letting (a) represent the percent weight loss at the core center and (b) represent the percent weight loss at the core surface, the value (a) is preferably 1.31 wt % or less and the value (b) is preferably 1.37 wt % or less. Also, the value (a)/(b) obtained by dividing (a) by (b) is preferably 0.96 or less. When (a)/(b) is 0.96 or less, the core can be said to be fully heat treated, enabling a golf ball core having a high initial velocity to be obtained.

The core obtained by the above manufacturing method, in order to effectively elicit the properties thereof, is set to a diameter of preferably at least 30 mm, and more preferably at least 34 mm, but preferably not more than 42 mm, and more preferably not more than 40 mm.

When manufacturing a golf ball using the above core, the ball can be obtained by encasing the periphery of the core with a cover of one, two or more layers. The cover material is exemplified by, but not limited to, ionomer resins and polyurethane resins.

Methods for encasing the core with such a cover are exemplified by the method of pre-molding various cover compositions into hemispherical half-shells, using two such half-shells to envelope the core, and molding for 1 to 15 minutes under applied pressure at between 130 and 230° C.; and the method of enveloping the core by injection-molding such a cover-forming composition directly over the core.

Numerous dimples may be formed on the surface of the inventive golf ball. Also, where necessary, the ball surface may be marked, painted, and surface treated. For competitive play, this solid golf ball can be made to conform to the Rules of Golf. Specifically, the ball may be formed to a diameter of not less than 42.67 mm and a weight of not more than 45.93 g.

EXAMPLES

Working Examples and Comparative Examples are provided below to illustrate the invention, and are not intended to limit the scope thereof.

Working Examples 1 to 18, Comparative Examples 1 to 7

Formation of Core

Cores were produced by preparing the two rubber compositions shown in Table 1, and subsequently molding and vulcanizing the compositions under vulcanization conditions of 157° C. and 15 minutes. In all the Working Examples and Comparative Examples, the cores had a common diameter of 37.70 mm.

TABLE 1

| Rubber composition (pbw) | I | II |
|---|---|---|
| Polybutadiene rubber | 100 | 100 |
| Zinc oxide | 4 | 4 |
| Barium sulfate | 20.92 | 18.56 |
| Antioxidant | 0.1 | 0.1 |
| Zinc salt of pentachlorothiophenol | 1 | 0.4 |
| Zinc acrylate | 18.7 | 22.6 |
| Zinc stearate | 3.3 | 4.0 |
| Organic peroxide A | 0.6 | |
| Organic peroxide B | 0.24 | 1.0 |

Details on the rubber compositions in Table 1 are given below.
Polybutadiene rubber: Available under the trade name "BR01" from JSR Corporation
Zinc oxide: Available as "Zinc Oxide Grade 3" from Sakai Chemical Co., Ltd.
Barium sulfate: Available under the trade name "Barico #100" from Hakusui Tech
Antioxidant: Available the trade name "Nocrac NS-6" from Ouchi Shinko Chemical Industry Co., Ltd.
Zinc salt of pentachlorothiophenol: Available from Wako Pure Chemical Industries, Ltd.
Zinc acrylate: Available from Wako Pure Chemical Industries, Ltd.
Zinc stearate: Available from Wako Pure Chemical Industries, Ltd.
Organic Peroxide A: Dicumyl peroxide, available under the trade name "Percumyl D" from NOF Corporation
Organic Peroxide B: 1,1-Di(t-butylperoxy)cyclohexane, available under the trade name "Perhexa C" from NOF Corporation These cores were heat-treated under the temperature, time, atmosphere and pressure conditions shown in Tables 2 and 3 below. The weight losses at the core center and core surface following heat treatment are also presented in these tables. The heat treatment entailed using a square fixed-temperature vacuum drying oven (DP300, from Yamato Scientific Co., Ltd.) and a small oil-sealed rotary vacuum pump (GLD-136C, from Ulvac Kiko, Inc.), arranging 30 cores side by side within the oven, and carrying out heat treatment. In cases where a nitrogen purge was carried out, Grade 3 nitrogen was used; testing was performed after thorough deaeration followed by purging. The cores that had been heat-treated for a given period of time were removed and fully cooled at room temperature (24° C.), following which the weight loss measurement described below was carried out.

Thermogravimetric Analysis (TGA)

Using a TG-8120 thermogravimetric/differential thermal analyzer from Rigaku Corporation, the amount of decrease was measured at a temperature rise rate of 10° C./min and a holding time at 210° C. of 18 hours. This measurement was carried out in a nitrogen atmosphere, using $Al_2O_3$ as the standard sample, and at a sample weight of 10 mg. The measurement samples were cut from the center portion of the core and from the core surface.

Formation of Cover (Intermediate Layer and Outermost Layer)

Next, an ionomer resin material (an ionomer compound of Himilan 1605, Himilan 1706 and Himilan 1557 from DuPont-Mitsui Polychemicals Co., Ltd. was used; the Shore D hardness of the resin material was 63) was injection-molded as the intermediate layer material over the cores obtained as described above, thereby encasing the cores and giving intermediate spherical bodies having an intermediate layer thickness of 1.68 mm. The intermediate spherical body was then set in a different injection mold and a polyurethane resin material (a urethane compound of Pandex T8283, Pandex T8290 and Pandex T8295 from DIC Bayer Polymer, Ltd.; the Shore D hardness of the resin material was 47) was injection-molded as the outermost layer material, thereby encasing the intermediate spherical body and producing three-piece solid golf balls having an outermost layer thickness of 0.8 mm. During this injection-molding operation, specific dimples were formed on the cover surface.

The ball deflection and initial velocity for each of the resulting golf balls were evaluated by the following methods. The results are shown in Tables 2 and 3.

Golf Ball Deflection

The golf ball was placed on a hard plate and the deflection when compressed under a final load of 1,275 N (130 kgf) from an initial load of 98 N (10 kgf) was measured. The deflection here is the measured value obtained after holding the golf ball isothermally at 23.9° C.

Initial Velocity of Golf Ball

The initial velocity of the golf ball was measured using an initial velocity measuring apparatus of the same type as the USGA drum rotation-type initial velocity instrument approved by the R&A. The golf ball to be measured was held isothermally at a temperature of 23±1° C. for at least 3 hours, and measurement was carried out in a chamber at a room temperature of 23±2° C. Twenty golf balls were each hit twice. The time taken for the golf ball to traverse a distance of 6.28 ft (1.91 m) was measured and used to compute the initial velocity.

TABLE 2

| | | Working Example | | | | | | | |
|---|---|---|---|---|---|---|---|---|---|
| | | 1 | 2 | 3 | 4 | 5 | 6 | 7 | 8 |
| Core used | | I | I | I | I | I | I | I | I |
| Heat treatment | Treatment temperature (° C.) | 175 | 175 | 210 | 210 | 250 | 250 | 175 | 210 |
| | Treatment time (h) | 6 | 12 | 1 | 6 | 1 | 4 | 6 | 1 |
| | Cumulative temperature | 486 | 538 | 420 | 583 | 500 | 651 | 486 | 420 |
| | Atmosphere | air | air | air | air | air | air | air | air |
| | Pressure (Pa) | 100 | 100 | 100 | 100 | 100 | 100 | 5000 | 5000 |
| Weight loss (wt %) | Core center | 1.22 | 1.06 | 1.24 | 1.02 | 1.23 | 1.01 | 1.25 | 1.24 |
| | Core surface | 1.33 | 1.21 | 1.33 | 1.14 | 1.33 | 1.17 | 1.36 | 1.33 |
| | Core center/ Core surface | 0.917 | 0.876 | 0.932 | 0.895 | 0.925 | 0.863 | 0.919 | 0.932 |
| Ball deflection (mm) | | 3.5 | 3.4 | 3.5 | 3.3 | 3.5 | 3.3 | 3.7 | 3.6 |
| Ball initial velocity (m/s) | | 77.3 | 77.5 | 77.3 | 77.5 | 77.3 | 77.6 | 77.2 | 77.3 |

| | | Working Example | | | | Comparative Example | | | |
|---|---|---|---|---|---|---|---|---|---|
| | | 9 | 10 | 11 | 12 | 1 | 2 | 3 | 4 |
| Core used | | I | I | I | I | I | I | I | I |
| Heat treatment | Treatment temperature (° C.) | 175 | 210 | 175 | 210 | — | 130 | 170 | 170 |
| | Treatment time (h) | 6 | 1 | 6 | 1 | — | 4 | 1 | 1 |
| | Cumulative temperature | 486 | 420 | 486 | 420 | — | 338 | 340 | 340 |
| | Atmosphere | air | air | nitrogen | nitrogen | — | air | air | air |
| | Pressure (Pa) | atmospheric | atmospheric | atmospheric | atmospheric | — | 100 | 100 | atmospheric |
| Weight loss (wt %) | Core center | 1.26 | 1.25 | 1.26 | 1.23 | 1.39 | 1.35 | 1.34 | 1.35 |
| | Core surface | 1.35 | 1.33 | 1.35 | 1.33 | 1.43 | 1.39 | 1.39 | 1.38 |
| | Core center/ Core surface | 0.933 | 0.940 | 0.933 | 0.925 | 0.972 | 0.971 | 0.964 | 0.978 |
| Ball deflection (mm) | | 3.6 | 3.6 | 3.6 | 3.6 | 3.7 | 3.7 | 3.7 | 3.7 |
| Ball initial velocity (m/s) | | 77.2 | 77.2 | 77.3 | 77.2 | 77.0 | 77.0 | 77.0 | 77.0 |

TABLE 3

| | | Working Example | | | | | | Comparative Example | | |
|---|---|---|---|---|---|---|---|---|---|---|
| | | 13 | 14 | 15 | 16 | 17 | 18 | 5 | 6 | 7 |
| Core used | | II | II | II | II | II | II | II | II | II |
| Heat treatment | Treatment temperature (° C.) | 175 | 210 | 250 | 175 | 175 | 175 | — | 130 | 170 |

TABLE 3-continued

|  |  | Working Example |  |  |  |  |  | Comparative Example |  |  |
|---|---|---|---|---|---|---|---|---|---|---|
|  |  | 13 | 14 | 15 | 16 | 17 | 18 | 5 | 6 | 7 |
|  | Treatment time (h) | 6 | 1 | 1 | 6 | 6 | 6 | — | 4 | 1 |
|  | Cumulative temperature | 486 | 420 | 500 | 486 | 486 | 486 | — | 338 | 340 |
|  | Atmosphere | air | air | air | air | air | nitrogen | — | air | air |
|  | Pressure (Pa) | 100 | 100 | 100 | 5000 | atmospheric | atmospheric | — | 100 | 100 |
| Weight loss (wt %) | Core center | 1.24 | 1.21 | 1.23 | 1.24 | 1.25 | 1.25 | 1.40 | 1.39 | 1.38 |
|  | Core surface | 1.36 | 1.33 | 1.35 | 1.35 | 1.35 | 1.36 | 1.42 | 1.42 | 1.42 |
|  | Core center/Core surface | 0.912 | 0.910 | 0.911 | 0.919 | 0.926 | 0.919 | 0.986 | 0.979 | 0.972 |
| Ball deflection (mm) |  | 3.2 | 3.2 | 3.2 | 3.2 | 3.2 | 3.2 | 3.4 | 3.4 | 3.4 |
| Ball initial velocity (m/s) |  | 77.4 | 77.4 | 77.5 | 77.3 | 77.3 | 77.2 | 77.0 | 77.0 | 77.0 |

In Tables 2 and 3, "cumulative temperature" is the value calculated from K×(2+Log T), where K is the heating temperature (° C.) and T is the heating time (h).

As is apparent from Tables 2 and 3, the golf balls obtained by the heat treatment in the Working Examples of the invention, when compared with the golf balls obtained by the heat treatment in the Working Examples, had lower energy losses and, both when the core used was I and when it was II, were able to achieve higher initial velocities.

Japanese Patent Application No. 2016-124465 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of manufacturing a golf ball having a core and a cover of at least one layer encasing the core, comprising the steps of:
producing a core by molding and completely vulcanizing a rubber composition containing (A) a base rubber, (B) a metal salt of an α,β-unsaturated carboxylic acid, and (C) an organic peroxide; and
heat-treating the core for 1 to 24 hours at between 210 and 250° C. after producing the core by molding and completely vulcanizing the rubber composition, wherein in the core made by the above step of heat-treating the core, when the amount of decrease is measured at a temperature rise rate of 10° C./min and a holding time at 210° C. of 18 hours in thermogravimetric analysis of the core and letting (a) represent the percent weight loss at a center of the core and (b) represent the percent weight loss at a surface of the core, the value (a)/(b) is from 0.863 to 0.940.

2. The method of claim 1 wherein, letting the heating temperature and heating time in the heat treatment step be respectively K (° C.) and T (h), the cumulative temperature X computed as X=K×(2+Log T) is from 350 to 850.

3. The method of claim 2, wherein the cumulative temperature X is at least 420.

4. The method of claim 1, wherein the pressure during heat treatment is atmospheric pressure or below.

5. The method of claim 1, wherein heat treatment of the core in the heat treatment step is carried out in an atmosphere selected from the group consisting of air, hydrogen, oxygen, nitrogen, noble gases, carbon dioxide, and mixed gases thereof.

6. The method of claim 5, wherein heat treatment of the core in the heat treatment step is carried out in an atmosphere selected from the group consisting of nitrogen, noble gases, and mixed gases thereof.

7. The method of claim 2, wherein the cumulative temperature X is from 420 to 651.

8. The method of claim 1, wherein the core consists of a single layer.

* * * * *